United States Patent [19]

Matsuura et al.

[11] Patent Number: 4,893,295
[45] Date of Patent: Jan. 9, 1990

[54] FRONT LOADING DISK PLAYER

[75] Inventors: Ryo Matsuura; Nobuyuki Isobe; Masao Kase, all of Saitama, Japan

[73] Assignee: Pioneer Electronic Corporation, Tokyo, Japan

[21] Appl. No.: 284,836

[22] Filed: Dec. 13, 1988

Related U.S. Application Data

[63] Continuation of Ser. No. 60,699, Jun. 11, 1987, abandoned.

[30] Foreign Application Priority Data

Jun. 11, 1986 [JP] Japan ............................... 61-135241
Jun. 11, 1986 [JP] Japan ............................... 61-135242

[51] Int. Cl.$^4$ ..................... G11B 17/04; G11B 25/04
[52] U.S. Cl. ..................................... 369/75.2; 369/265
[58] Field of Search ................ 369/75.2, 178, 198, 369/265

[56] References Cited

U.S. PATENT DOCUMENTS

2,608,456  8/1952  Barth .................................. 369/75.2
4,340,952  7/1982  Ikedo .................................. 369/75.2
4,625,304  11/1986 Kanamaru et al. ................ 369/75.2
4,653,039  3/1987  Ueno et al. .......................... 369/75.2

Primary Examiner—Steven L. Stephan
Attorney, Agent, or Firm—Sughrue, Mion, Zinn, Macpeak & Seas

[57] ABSTRACT

A front loading disc player is disclosed which comprises a housing, a play mechanism including a turntable, a carrier for carrying a disc to be played, and a projection/accommodation mechanism for moving the carrier so as to project/accommodate the carrier out-of-into the housing to perform loading/ejection of the disc. The projection/accommodation mechanism includes moving members movably provided within said housing, a driving force application unit for applying a driving force to the moving members, and a carrier moving mechanism for moving the carrier in a horizontal direction and a vertical direction in response to the movement of the moving members. The carrier moving mechanism is provided with a speed multiplier for moving the carrier at a speed higher than the moving speed of the moving members as the moving members move.

7 Claims, 9 Drawing Sheets

FRONT LOADING DISK PLAYER

This is a continuation of application Ser. No. 07/060,699, filed June 11, 1987, now abandoned.

BACKGROUND OF THE INVENTION

The present invention relates to a disc player and particularly relates to a front loading disc player provided with a disc conveying mechanism for automatically conveying a disk to a play position.

Known is a front loading disc player in which a disc, such as an audio disc having sound grooves on its surface, a digital audio disc on which PCM signals are recorded, or the like, is carried by a carrier which is arranged to be projected/accommodated out-of/into a player housing so that the disc can be completely accommodated within the player housing to thereby make it possible to effectively use the space on the upper surface of the disc player, for example, for mounting an article thereon, or the like.

There has been developed a front loading disc player of the type described above, which is provided with a projection/accommodation means for moving the above-mentioned carrier to automatically project/accommodate the carrier out-of/into the player housing so as to make it possible to save the time taken in loading/ejecting a disc to the utmost. In this front loading disc player, when a disc mounted on the carrier outside the player housing is brought into a play position or positioned on a turntable, the disc is conveyed in the two directions, that is, in the horizontal and vertical directions. To this end, the conventionally used carrier is constituted by two carrying members, one being a tray arranged to be reciprocatively horizontally movable relative to the player housing and the other being a container attached to the tray so as to be reciprocatively movable in the vertical direction. The container can be projected out of the player housing together with the tray and can carry a disc in cooperation with the tray.

When a disc mounted on the container is played in such a front loading disc player, the tray is moved horizontally together with the container so as to be accommodated in the player housing and fixed to the player housing at the same time, and succeedingly only the container is moved vertically so that the disc on the container is mounted on the turntable. To this end, complicated operation switching mechanisms for properly switching the operation between the tray and container are provided, resulting in an increased number of parts as well as in the increased cost as a whole.

SUMMARY OF THE INVENTION

The present invention has been attained in view of the points described above, and an object thereof is to provide a front loading disc player which is low in cost and in which disc loading/ejection can be performed rapidly.

According to one aspect of the present invention, the front loading disc player comprises: a housing; a play means including a turntable; a carrier for carrying a disc to be played; and a projection/accommodation means for moving the carrier so as to project/accommodate the carrier out-of/into the housing to perform loading/ejection of the disc; the projection/accommodation means including moving members movably provided within the housing, a driving force application means for applying a driving force to the moving members, and a carrier moving means for moving the carrier horizontally and vertically in response to the movement of the moving members, the carrier moving means being provided with a speed multiplier mechanism for moving the carrier at a speed which is a predetermined number of times higher than the moving speed of the moving members.

DESCRIPTION OF THE PREFERRED EMBODIMENTS

Referring to the accompanying drawings an embodiment of the front loading disc player according to the present invention will be described hereunder.

Figure 1:
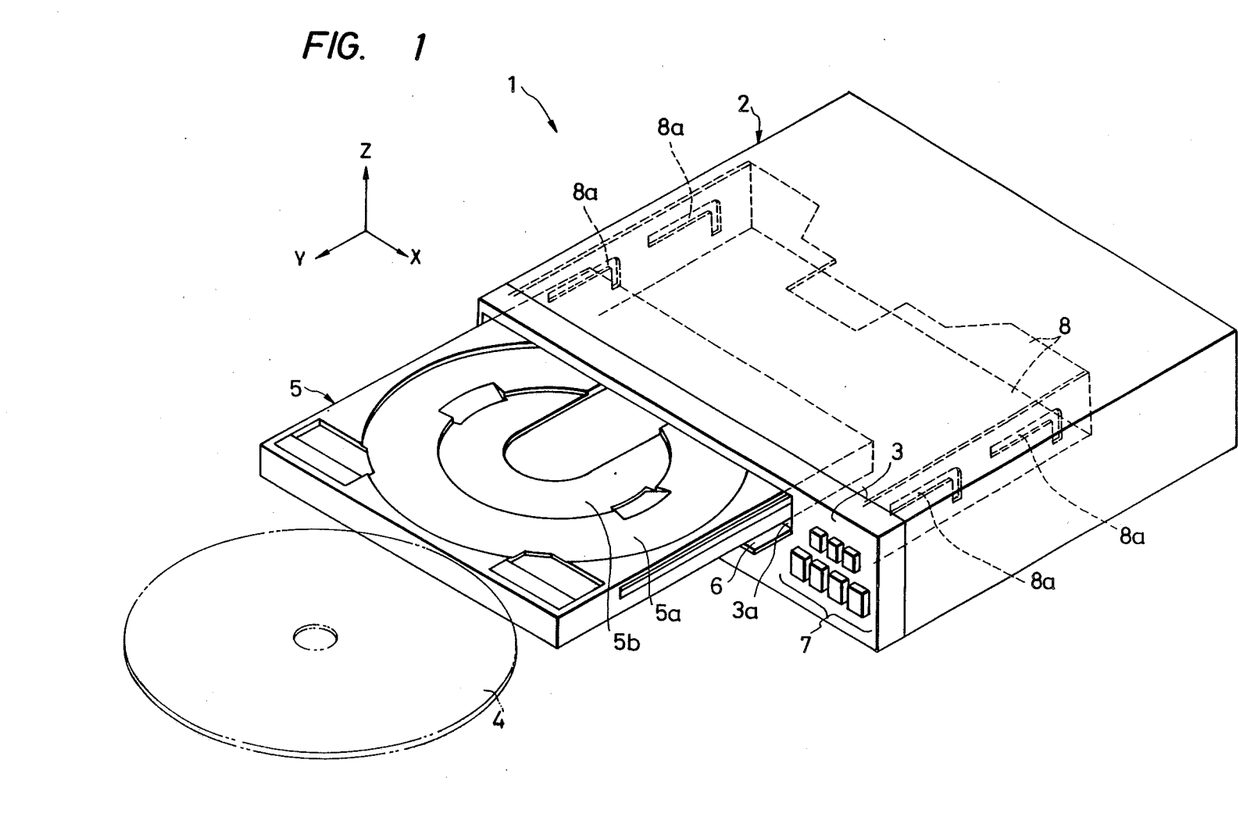
FIG. 1 is a perspective view showing the whole of the front loading disc player according to the present invention.

In FIG. 1, the reference numeral 1 generally designates the front loading disc player.

As shown in FIG. 1, a rectangular opening portion 3a extending left and right is formed in the front portion or front panel 3 of a player housing 2 so that a carrier 5 for carrying a disc 4 to be played can be projected out of the player housing 2. In the drawing, arrows X, Y and Z represent the frontward, left, and up directions respectively. A plate-like door 6 for closing the opening portion 3a is provided in the vicinity of the opening. Switches 7 for operating the disc player are provided on the front panel 3.

A chassis 8 made of a steel plate is provided inside the player housing 2, and a playing means including a turntable and an optical pickup means, which will be described later, is provided on the chassis.

Figure 2:
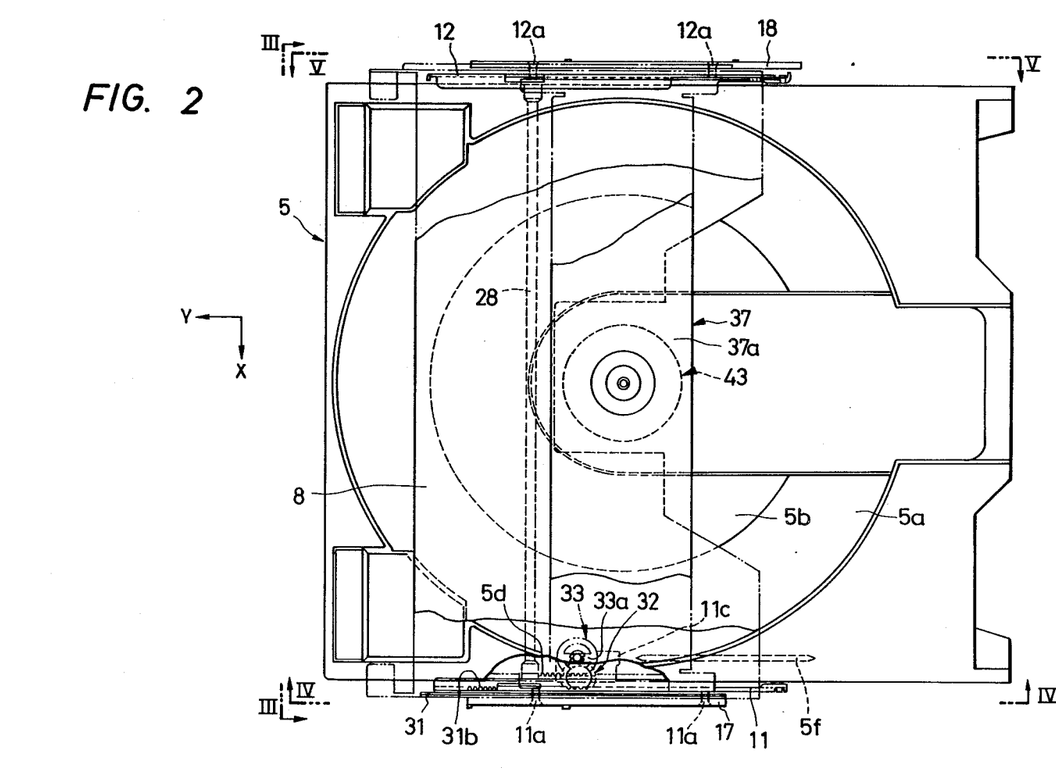
FIG. 2 is a plan view showing the interior structure of the disc player of FIG. 1.

As shown in FIGS. 1 and 2, two circular shallow recessed portions 5a and 5b are formed coaxially with each other in the upper surface of the carrier 5 so that, for example, optical video discs of about 30 cm and about 20 cm in diameter can be fitted in the recessed portions 5 and 5b respectively. As shown in FIGS. 2 through 5, a pair of supporting members 11 and 12 each made of a rectangular steel plate are provided so as to sandwich the carrier 5 at its left and right opposite side portions. The carrier 5 is supported by the supporting members 11 and 12 through rollers 15 (shown in FIG. 3) so as to be movable in the direction parallel to a disk carrying surface 14a of a turntable 14 (shown in FIG. 3), in this case, in the frontward/rearward direction (the direction indicated by the arrow and the direction opposite thereto). Further, in FIGS. 6 and 7, respective side views of the supporting members 11 and 12 are illustrated in detail. As shown in FIG. 2 and FIGS. 4 through 7, a pair of pins 11a and a pair of pins 12a, are projectingly provided at the respective outside surfaces of the supporting members 11 and 12, each pair being disposed with separation in the frontward/rearward direction (the direction indicated by the arrow Y and the direction opposite thereto). The pins 11a and the pins 12a are movably inserted in respective L-shaped guide holes 8a (see FIGS. 1, 4 and 5) formed in the chassis 8. That is, the supporting members 11 and 12 are arranged so as to move along the L-shaped guide holes respectively. Each of the L-shaped guide holes 8a is composed of a horizontal portion extending horizontally and a vertical portion contiguous with the horizontal portion and extending vertically (down) from the rear end portion of the horizontal portion.

Figure 8:
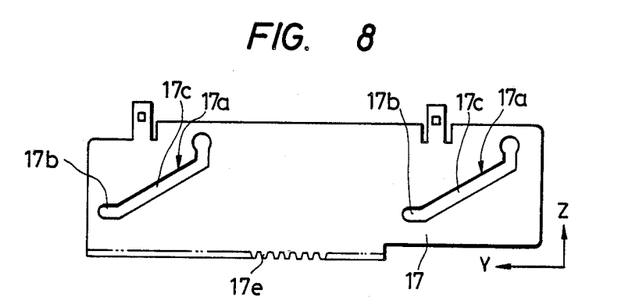
Figure 9:
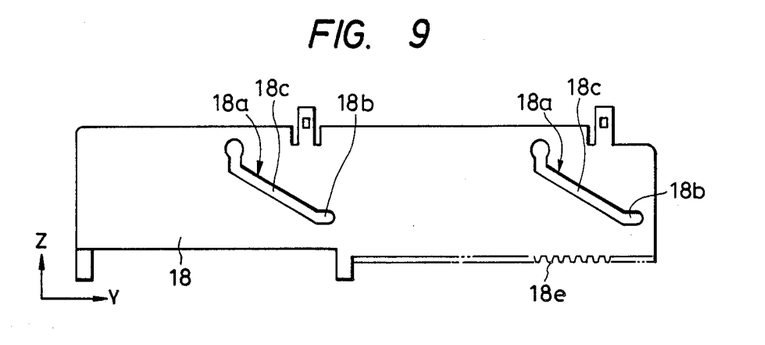

As shown in FIGS. 2 through 5, a pair of right and left rectangular plate-like moving members 17 and 18 are arranged so as to sandwich the L-shaped guide holes 8a together with the supporting members 11 and 12. In FIGS. 8 and 9, respective side views of the moving members 17 and 18 are illustrated in detail. The moving members 17 and 18 are attached on the chassis 8 so as to be reciprocatively movable in the frontward/rearward direction (the direction indicated by the arrow Y and the direction opposite thereto). The pins 11a and the pins 12a projectingly provided on the respective outside surfaces of the supporting members 11 and 12 are slidably engaged with respective cam holes 17a and 18a formed in the respective moving members 17 and 18 (see FIGS. 4, 5, 8 and 9) through the respective L-shaped guide holes 8a formed in the chassis 8. As is apparent from FIGS. 8 and 9, the cam holes 17a and 18a are composed of respective horizontal portions 17b and 18b extending horizontally and respective slanting portions 17c and 18c connected to the respective rear end portions of the horizontal portions 17b and 18b and extending up slantingly (toward the direction indicated by the arrow Z). That is, the cam holes 17a and 18a are formed so that the carrier 5 is movable up/down (in the direction indicated by the arrow Z and the direction opposite thereto) together with the supporting members 11 and 12 owing to the frontward/rearward movement of the moving members 17 and 18.

Figure 3:
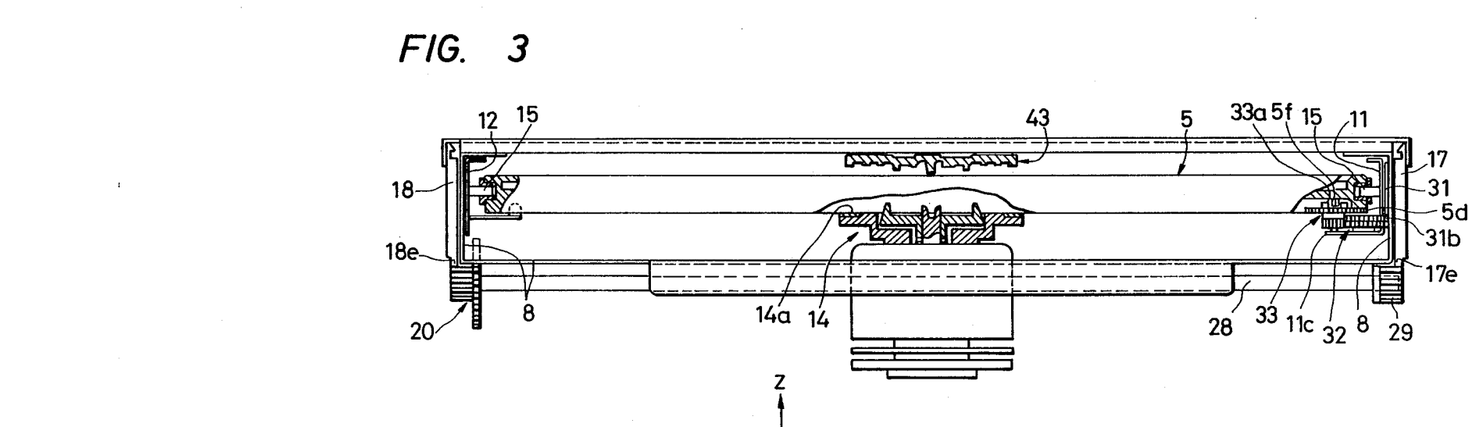
FIGS. 3 through 5 are diagrams partly in section showing parts of FIG. 2 when viewed along the arrows III—III, IV—IV, and V—V respectively.
Figure 4:
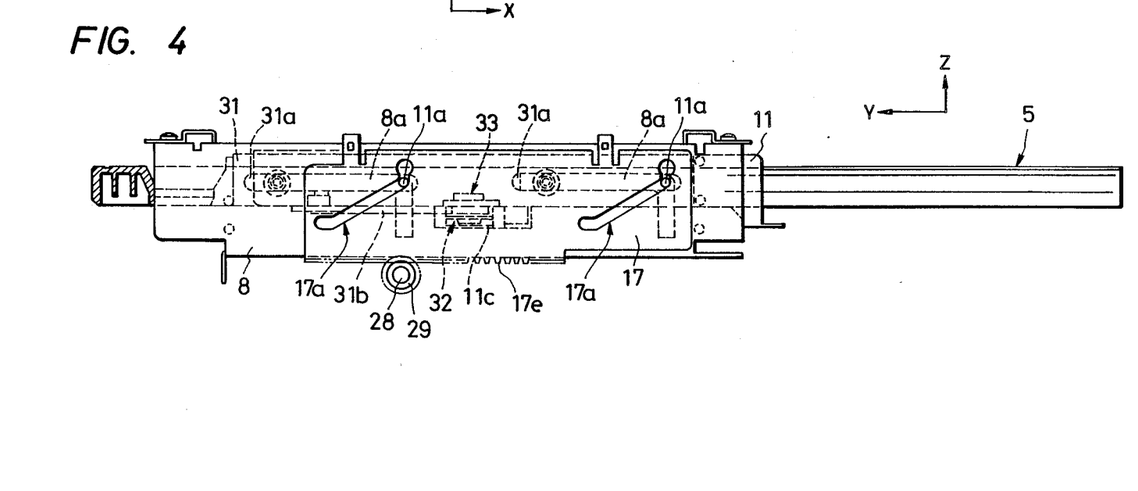
Figure 5:
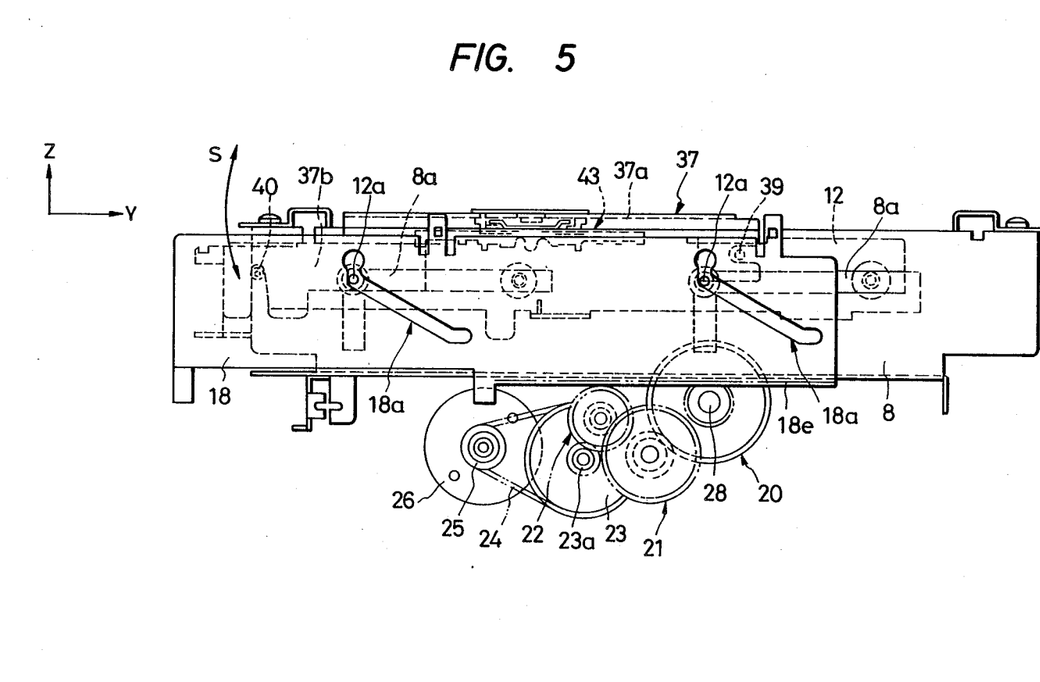
Figure 6:
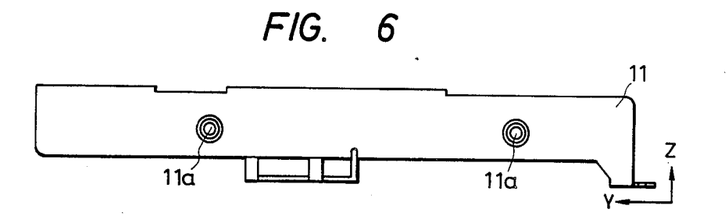
FIGS. 6 through 13 are detailed diagrams showing various parts of the above-mentioned interior structure.
Figure 7:
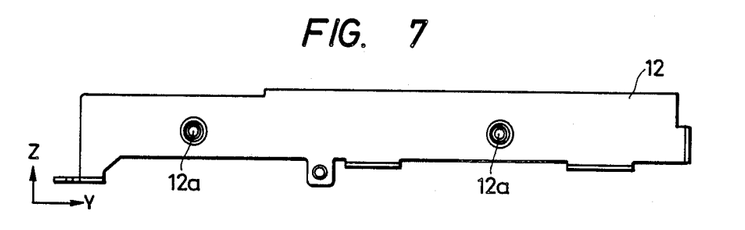

As shown in FIGS. 3 through 5 and FIGS. 8 and 9, rack portions 17e and 18e are respectively formed at the respective lower end portions of the pair of right and left moving members 17 and 18. As shown in FIGS. 3 and 5, a pinion portion of a double gear 20 meshes with the rack portion 18e formed in the right moving member 18. The double gear 20 is coupled with an output shaft of an electric motor 26 through another double gear 21 provided with a pinion portion in mesh with a wheel portion of the double gear 20, still another double gear 22 provided with a pinion portion meshed with a wheel portion of the double gear 21, a pulley 23 provided with an integrally formed gear portion 23a meshed with a wheel portion of the double gear 22, a belt 24, and a small pulley 25, in the order mentioned above. As is apparent from FIGS. 2, 3, and 5, the double gear 20 and a gear 29 are fittingly mounted on a shaft 28 at one and the other ends respectively, the gear 29 being engaged with the rack portion 17e formed on the left moving member 17. That is, the left and the right moving members 17 and 18 are moved together as the motor 26 rotates.

The means for applying driving force to the pair of moving members 17 and 18 is constituted by the double gears 20, 21, and 22, and the pulley 23, the belt 24, the small pulley 25, the motor 26, the shaft 28, and the gear 29. A carrier moving means for moving the carrier 5 horizontally/vertically in accordance with the movement of the moving members 17 and 18 is constituted by the pair of supporting members 11 and 12 and the chassis 8 in which the L-shaped guide holes 8a are formed. Since the carrier moving means is constituted by members made of steel plate, etc., the cost of the player as a whole is reduced and the player per se can be produced very easily. Further, a projection/accommodation means for projecting/accommodating the carrier 5 out-of/into the player housing 2 so as to perform loading/ejection of the disc 4 is constituted by the carrier moving means, the moving members 17 and 18, and the driving force application means (constituted by the motor 26, etc.).

Figure 10:
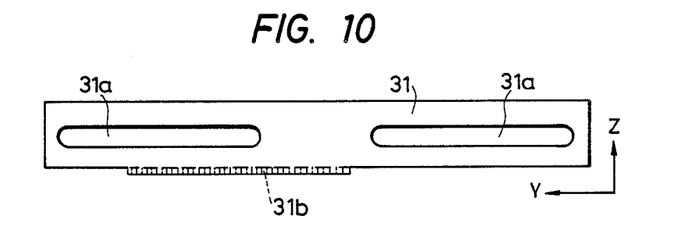

As shown in FIGS. 2 through 4, a rectangular plate-like rack member 31 extending in the frontward/rearward direction is disposed at a position sandwiched by the chassis 8 and the supporting member 11. FIG. 10 is a side view showing the rack member 31. The rack member 31 is attached to the chassis 8 so as to be movable only up/down. As is particularly apparent from FIG. 10, a pair of elongated holes 31a extending frontward/rearward is formed in the rack member 31, and the pair of pins 11a projectingly provided on the supporting member 11 are slidably engaged with the elongated holes respectively. That is, the rack member 31 moves up/down together with the supporting member 11. As is particularly apparent from FIG. 10, a rack portion 31b is formed on the lower end portion of the rack member 31 along its longitudinal direction. As shown in FIGS. 2 through 4, a pinion of a double gear 32 is engaged with the rack portion 31b. A pinion portion of another double gear 33 is engaged with a wheel portion of the double gear 32, and a rack portion 5d formed on the carrier 5 along its moving direction is in mesh with a wheel portion of the double gear 33. The double gears 32 and 33 are attached to a bracket portion 11c which is provided on the supporting member 11 so as to project therefrom, so that the double gears 32 and 33 are movable up/down together with the supporting member 11.

A speed multiplier mechanism for moving the carrier 5 at a higher rate of speed than the moving member 17 (18) is constituted by the rack member 31, the rack portion 5d formed on the carrier 5, and the double gears 32 and 33. The ratio of the moving speed of the moving member 17 (18) to that of the carrier 5 is determined by the number of teeth of the double gears 32 and 33, and in this embodiment, the ratio is selected to be about 1:4.

The speed multiplier mechanism is included in the carrier moving means described above. Since the speed multiplier mechanism is constituted by the gear mechanism and the rack portion as described above, the speed ratio of the carrier 5 to the moving member 17 (18) can be changed easily, and this change can be carried out at a low cost.

The rack member 31 is arranged so as to be movable together with the supporting member 11 as described above. However, the rack member 31 may be fixed on the chassis 8. In this case, the length of the rack portion 31b formed on the rack member 31 must be made longer than the range of movement of the double gear 33 which is meshed with the rack portion 31b so as to be movable up/down together with the supporting member 11.

Next, description will be made as to a clamp mechanism for clamping the disc at a play position, that is, on the turntable 14 (shown in FIG. 3).

Figure 11:
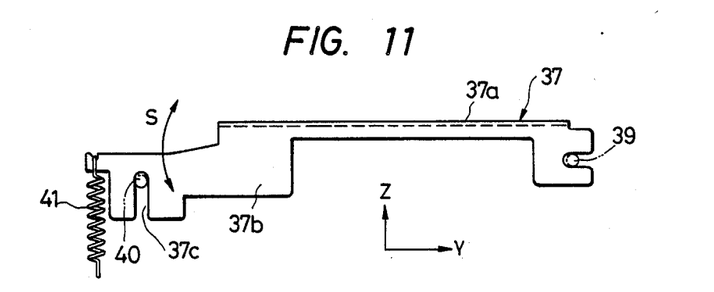

In the player housing 2, as shown in FIGS. 2 and 5, there is provided a retaining member 37 constituted by a rectangular plate-like plane portion 37a extending left/right and an elevated portion 37b connected to the end portion of the plane portion 37a. FIG. 11 is a side view showing the retaining member 37 in detail. As is apparent from FIGS. 5 and 11, the retaining member 37 is pivoted on pins 39 at the front end portion of the elevated portion 37b. The pins 39 are projectingly provided on the supporting members 11 and 12 respectively. The pins 39 for pivotally supporting the retaining member 37 are extended in parallel with the disc carrying surface of the turntable 14, so that the retaining member 37 is swingable in a plane (the direction indicated by an arrow S) perpendicular to the disc carrying surface. As particularly shown in FIG. 11, a notched portion 37c having a predetermined curvature is formed at the other end portion of the elevated portion 37b and is swingably engaged with pins 40 (shown also in FIG. 5) so as to swingably guide the retaining member 37. Similarly to the above-mentioned pins 39, the pins 40 are projectingly provided on the supporting members 11 and 12 respectively. As shown in FIG. 11, a coil spring 41 is connected to a free end of the retaining member 37 so as to urge the free end portion to approach the turntable 14. As shown in FIGS. 2, 3 and 5, a disc-like pressing member 43 for pressing the disc 4 (see FIG. 1) against the turntable 14 is rotatably attached at the center portion of the plane portion 37a of the retaining member 37.

The clamp mechanism is constituted by the retaining member 37, the coil spring 41, and the pressing member 43.

Figure 12:
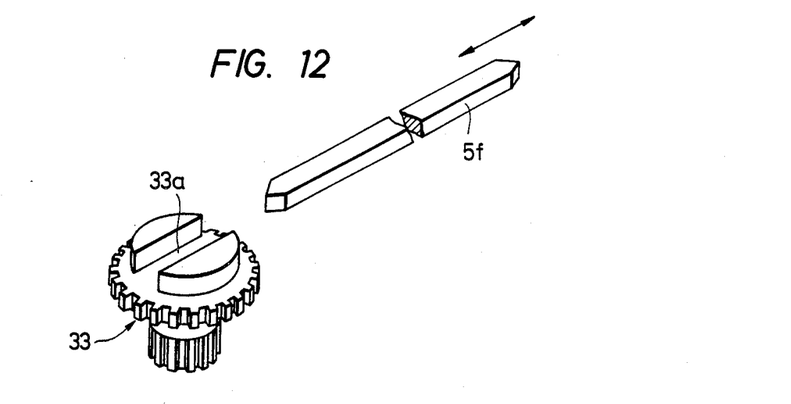

As shown in FIGS. 2, 3 and 12, a linear groove 33a extending in a radial direction of the double gear 33 is formed in the upper surface of the double gear 33 constituting a part of the speed multiplier mechanism. A linear protrusion 5f is formed on the lower surface of the carrier 5 along its moving direction. The linear groove 33a and the linear protrusion 5f have respective shapes complementary to each other so as to be fittingly engaged with each other. That is, when the wheel portion of the double gear 33 is to be engaged with the rack portion 5d formed on the carrier 5 in the assembly of the disc player or the like, the linear protrusion 5f is made to fit in the linear groove 33a so that the double gear 33 is fixed at a normal rotating position to thereby prevent any displacement in gearing position between the rack portion 5d and the double gear 33 from occurring. The engagement between the linear protrusion 5f and the linear groove 33a is released just before the rack portion 5d engages with the double gear 33.

Figure 13:
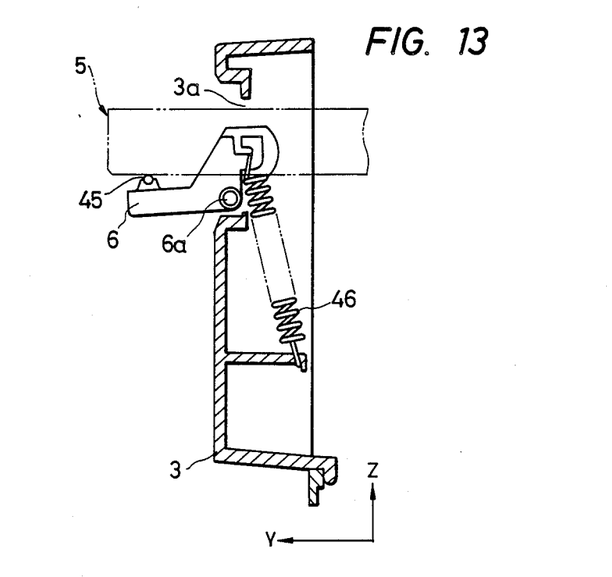

As shown in FIG. 13, the door 6 for closing the opening portion 3a formed in the front panel 3 is swingably supported by a supporting shaft 6a, and a member having a small coefficient of friction, in this embodiment a steel spherical body 45 is projectingly provided on the inner surface of the door and at a position where the door comes into contact with the carrier 5. The door 6 is urged in the closing direction by a coil spring 46, and when the carrier 5 performs a projection/accommodation operation out-of/into the player housing, the carrier 5 moves while touching the door 6 owing to the urging force. By the provision of the spherical body 45, the frictional force caused when the door 6 touches the carrier 5 is reduced, so that no noises owing to the friction between the door 6 and the carrier 5 are generated. Since the spherical body 45 is projectingly provided at a front end portion of the door 6, the door 6 is closed under the condition that the spherical body 45 touches the carrier 5 at its front upper end portion when the carrier is accommodated. Therefore, the speed of the front end portion of the door becomes the same as the moving speed of the carrier 5, so that the front end portion of the door never collides strongly against the front panel 3 in the door closing operation.

The member having a small coefficient of friction and slidably touching the carrier 5 is not limited to a spherical body 45 as described above, but may be a roller for example. Commercially available spherical bodies or rollers may be used thereby reducing the cost.

Figure 15:
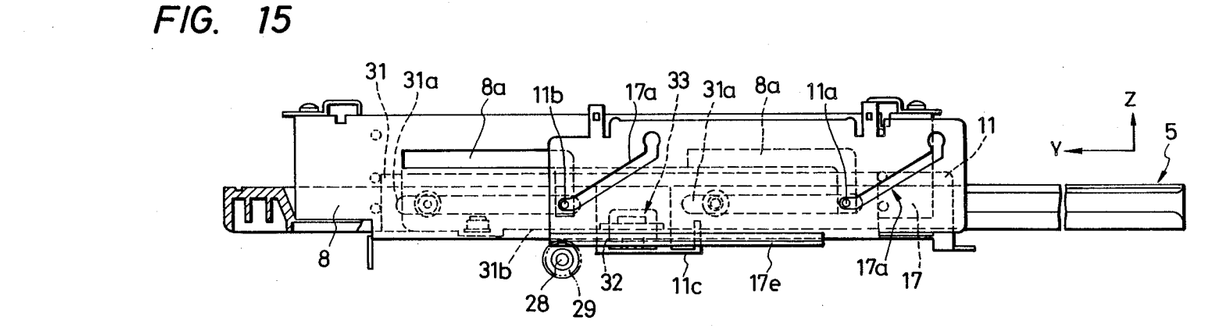
Figure 16:
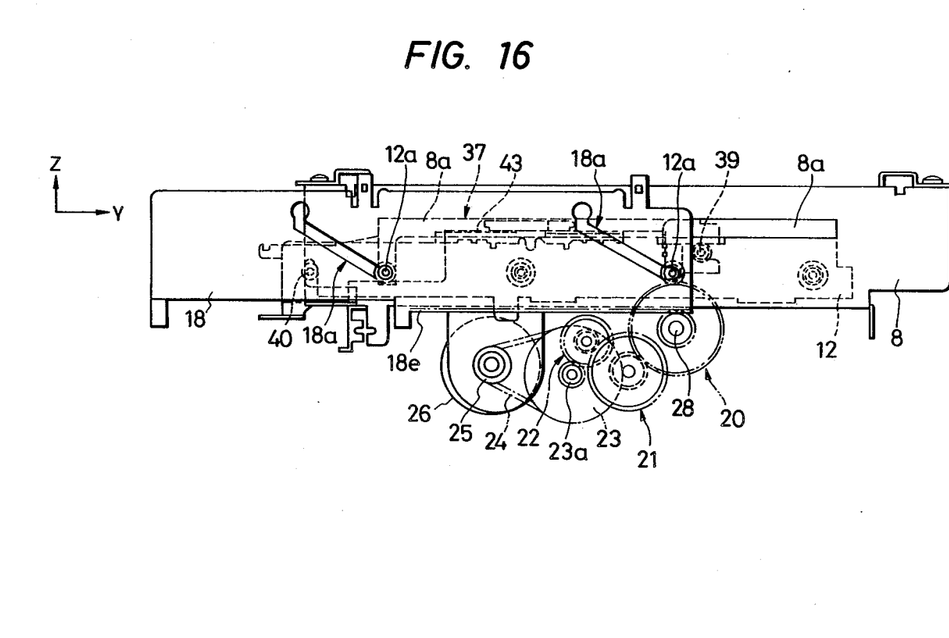

Next, referring to FIGS. 14 through 16, the operation of the thus arranged disc player will be described in brief along with the procedure of playing.

Figure 14:
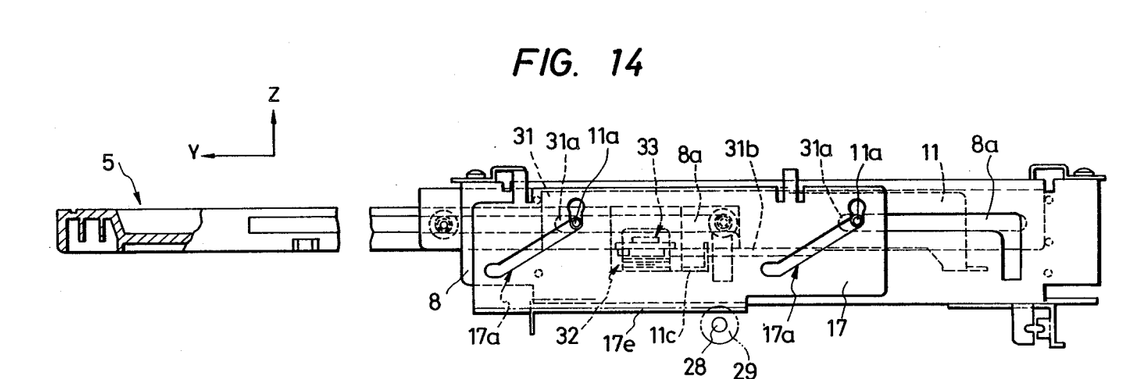
FIGS. 14 through 16 are diagrams explaining the operation of the disc player of FIG. 1.

As shown in FIGS. 1 and 14, the carrier 5 is projected out of the player housing 2, and the disc 4 is mounted in position on the carrier. The projecting operation of the carrier 5 out of the player housing is not described in detail because it is completely reverse to the accommodating operation which will be described hereunder.

After the disc 4 has been mounted on the carrier 5, a loading button included in the switches 7 (shown in FIG. 1) is pushed. The motor 26 (see FIG. 5) rotates, and the left and right moving members 17 and 18 begin to move rearward. The pins 11a and 12a are located at positions where the L-shaped guide holes 8a of the chassis 8 cross the cam holes 17a and 18a of the moving members 17 and 18 respectively, and hence the supporting members 11 and 12, move rearward. The double gears 32 and 33 (shown in FIG. 2 etc.) provided on the supporting member 11 move rearward as the supporting member 11 moves rearward. Being geared with the rack portion 31b formed on the rack member 31, the double gear 32 rotates clockwise in FIG. 2 as the supporting member 11 moves rearward. Therefore, the double gear 33 rotates counterclockwise in FIG. 2, so that the carrier 5 having the rack portion 5d geared with the double gear 33 moves rearward at a speed about four times as high as the moving speed of the moving members 17 and 18.

Thus, the carrier 5 reaches the position shown in FIGS. 2 through 5. The motor 26 rotates, and the moving members 17 and 18 are driven to move further rearward. In this manner, as shown in FIGS. 15 and 16, the carrier 5 comes down together with the supporting members 11 and 12, so that the disc 4 is mounted and clamped on the turntable 14 (shown in FIG. 3). Under the condition, the motor 26 stops rotating and the disc is ready for playing.

Upon termination of disc playing, the motor 26 begins to rotate reversely as described above, and the carrier 5 is projected out of the player housing 2 through steps reverse to those described above. Thus, the disc is withdrawn.

Although the carrier 5 is arranged to move horizontally and vertically in this embodiment, the moving direction of the carrier 5 is not limited to those described above but may be other directions depending on the set state of the disc player.

As described above in detail, the front loading disc player according to the present invention is provided with a carrier (5) for carrying a disc (4) to be played and a projection/accommodation means for moving the carrier so as to be projected/accommodated out-of/into a player housing 2 to thereby perform loading/ejection of the disc, the carrier being constituted by a single member, the projection/accommodation means being constituted by moving members (17, 18) movably provided within the player housing, a driving force application means (a motor 26, etc.) for applying driving force to the moving members, and a carrier moving means for moving the carrier horizontally and vertically in response to the movement of the moving members.

The front loading disc player is relatively simple in structure because that the carrier is constituted by a single member for carrying the disc in the two directions, horizontally and vertically, and the carrier moving means for moving the carrier is constituted by supporting members (11, 12) and a chassis (8), and therefore the parts for the front loading disc player are small in number as a whole, resulting in cost reduction.

Further, in the front loading disc player according to the present invention, the carrier moving means is provided with a speed multiplier mechanism (constituted by the double gears 32 and 33, etc.) for moving the carrier at a speed higher than the moving speed of the moving member. Therefore, the disc transporting speed is such that the disc loading/ejection can be carried out rapidly.

What is claimed is:

1. A front loading disc player, comprising:
   a housing;
   play means including a turntable;
   a carrier for carrying a disc to be played; and
   projection/accommodation means for moving said carrier so as to project/accommodate said carrier out-of/into said housing, said projection/accommodation means including moving members movably provided within said housing, means for applying a driving force to said moving members, and carrier moving means for moving said carrier in a horizontal direction and a vertical direction in response to the movement of said moving members in a horizontal direction, said carrier moving means including a speed multiplier mechanism for moving said carrier at a higher rate of speed than that of said moving members as said moving members move in a horizontal direction, said speed multiplier mechanism being connected with said carrier in the middle of the movement of said moving members in the horizontal direction.

2. The player according to claim 1, in which said carrier moving means includes a pair of supporting members for movably supporting opposite sides of said carrier, and a chassis having opposite sides which sandwich said carrier and said supporting members therebetween, said opposite sides of said chassis respectively having L-shaped guide holes, said supporting members respectively having portions movably inserted into said guide holes correspondingly, said moving members being arranged to be movable in a horizontal direction and having cam holes engaged with said portions respectively, said cam holes being formed such that said carrier and said supporting members are moved in a vertical direction in response to the movement of said moving members.

3. The player according to claim 1, in which said speed multiplier mechanism includes a rack member provided on said chassis and provided with a rack portion, another rack portion on said carrier, and a gear mechanism constituted by a plurality of gears, one of said plurality of gears at a first stage and another of said plurality of gears at a final stage of said gear mechanism being engaged with said rack portions of said rack member and said carrier respectively.

4. The player according to claim 3, in which said rack member is arranged so as to move in said vertical direction together with said supporting members.

5. A front loading disc player comprising:
   a housing;
   play means including a turntable;
   a carrier for carrying a disc to be played; and projection/accommodation means for moving said carrier so as to project/accommodate said carrier out-of/into said housing;
   said projection/accommodation means including a rack portion formed on said carrier, a gear engaged with said rack portion, and a driving source for driving said gear, said carrier having a first engageable alignment means and said gear having teeth and a second engageable alignment means, said first and second alignment means respectively having shapes complementary to each other, and engaging one another so as to realize said gear and said rack portion in correct engagement with one another, said second engageable alignment means being released from engagement with said first engageable alignment means prior to the engagement of said gear by said rack portion.

6. The player according to claim 5, wherein said second engageable alignment means includes a straight groove extending in a direction of movement of said carrier.

7. The player according to claim 6, wherein said first engageable alignment means includes a straight protrusion extending in a direction of movement of said carrier.

* * * * *